3,475,481
POLYFLUORINATED IMINES AND β-AMINO-α,β-UNSATURATED NITRILES AND THEIR PREPARATION
Carl G. Krespan, Wilmington, Del., assignor to E. I. du Pont de Nemours and Company, Wilmington, Del., a corporation of Delaware
No Drawing. Filed Aug. 18, 1966, Ser. No. 573,177
Int. Cl. C07c 121/42, 119/00, 87/26
U.S. Cl. 260—465.5  8 Claims

ABSTRACT OF THE DISCLOSURE

Perhaloalkenes having internal saturation are reacted with an ammonia type compound $RNH_2$, where R is hydrogen or lower alkyl, to produce polyfluorinated imines and β-amino-α,β-unsaturated nitriles.

---

This invention relates to new polyfluorinated nitrogen compounds and to a process for preparing them.

The compounds of this invention are polyfluorinated imines and aminonitriles and have one of the formulas:

(1)
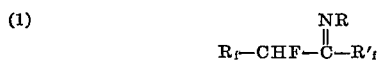

and (2)

in which R is hydrogen or lower alkyl, $R_f$ and $R'_f$ can be the same or different and represent lower perfluoroalkyl or lower ω-chloroperfluoroalkyl, and X is fluorine or chlorine.

These compounds are obtained by reacting an ammonia-type compound $RNH_2$, where R is hydrogen or lower alkyl, i.e., ammonia or a lower primary alkylamine, with an internally unsaturated perhalopolyfluoroalkene of the formula $R_f$—CX=CX—$R'_f$, where X, $R_f$, and $R'_f$ have the above-stated significance, at a temperature in the range of −50 to +150° C., the mole ratio of the ammonia-type reactant to the perhaloalkene being at least 2:1.

The compounds of Formula (1) are obtained from a perhaloalkene of formula $R_f$—CF=CF—$R'_f$, where each of $R_f$ and $R'_f$ can be any lower perfluoroalkyl or ω-chloroperfluoroalkyl group. The reaction is represented by the equation:

(A)

When the perhaloalkene is an unsymmetrical one, i.e., when $R_f$ and $R'_f$ are different, a mixture of the isomers

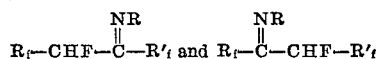

is generally formed. These mixtures can be separated into their components by methods such as gas-phase chromatography but, for most of the applications in which these products may be used, such a separation is unnecessary.

The compounds of Formula 2 are formed only when the perhaloalkene is a 1-(trifluoromethyl)perhalo-2-alkene, i.e., has the formula $CF_3$—CX=CX—$R_f$, where X is F or Cl and $R_f$ is lower perfluoroalkyl or ω-chloroperfluoroalkyl, and the ammonia-type reactant is ammonia itself. The reaction is represented by the equation:

(B)
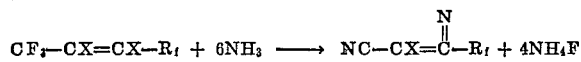

Of course, compounds of Formula 2 are also obtained in the reaction represented by Equation A when at least one of $R_f$ and $R'_f$ is $CF_3$ and $RNH_2$ is $NH_3$.

The reaction is conducted within the temperature range of −50° C. to +150° C., preferably between −40° C. and +100° C. When the reactants are such that both type (1) products (the β-fluoroalkylidenimines) and type (2) products (the β-amino-α,β-unsaturated perhalonitriles) can form, i.e., when the perhaloalkene reactant contains a $CF_3$—CF= group and the other reactant is ammonia, lower temperatures favor the formation of the type (1) product.

The pressure is immaterial, as the reaction can be conducted at atmospheric, or even subatmospheric, pressure or in sealed vessels either at the autogenous pressure developed by the reaction components at the operating temperature or under additional applied pressure, e.g., up to 1000 atmospheres or more.

For maximum utilization of the perhaloalkene reactant, the ammonia-type reactant should be used in a molar ratio of at least 2:1 relative to the perhaloalkene. This is the stoichiometric ratio required for the formation of type (2) compounds and, in the case of type (1) compounds, it is also sufficient to neutralize the hydrogen halide formed. In both cases, higher molar ratios, e.g., up to 12:1 or more, are preferred. The excess ammonia-type reactant serves to neutralize the hydrogen halide formed, although of course an excess is not necessary if an inert hydrogen halide absorber such as pyridine or triethylamine is present in the reaction mixture. An excess of ammonia-type reactant favors the formation of type (2) compounds when the perhaloalkene is such as to permit formation of both types.

A solvent or reaction medium is not necessary. However, in order to promote contact between the reactants, it is preferred to conduct the reaction in an inert solvent containing no active hydrogen (i.e., hydrogen attached to an atom other than carbon). Suitable solvents include ethers such as diethyl ether, di-n-butyl ether, 1,2-dimethoxyethane, tetrahydrofuran, or dioxane; aromatic hydrocarbons or halohydrocarbons such as benzene, toluene, the xylenes or chlorobenzene; nitriles such as acetonitrile or benzonitrile; tertiary amines such as pyridine or triethylamine; and the like.

The reaction products can be separated from the reaction mixture by any suitable conventional method such as fractional distillation under ordinary or reduced pressure, or crystallization when they are solids.

The internally unsaturated polyfluoroperhaloalkenes which are used to prepare the products of this invention are known compounds. Some of them are listed in Lovelace et al., "Aliphatic Fluorine Compounds" (Reinhold Publishing Corp., 1958), pp. 117–121. Other members of this class have been reported in the journal literature and in U.S. Patents 2,918,501, 2,925,446, 3,000,979, in French Patent 1,357,391, and still others can be prepared by the methods described in these publications.

The following examples illustrate the invention in greater detail.

EXAMPLE 1

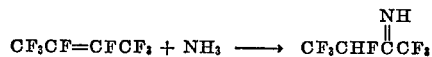

Octafluoro-2-butene (50 g., 0.25 mole, 28 ml. at −80° C.) was condensed into a cooled 1-liter flask containing 250 ml. of ether and fitted with a −80° C. reflux condenser, stirrer and gas inlet tube. Ammonia (25.5 g., 1.5 mole, 31 ml. at −80° C.) was distilled into the flask over a 45-minute period while the reaction mixture was being stirred at −15° C. When the addition was completed, stirring was continued for 30 minutes at −10° C., after which time the mixture was allowed to warm to room temperature. The mixture was then filtered and the filter cake was rinsed with ether. The filtrate and washings were combined and distilled to give 20.7 g. (42% yield) of 1-trifluoromethyl-2,3,3,3-tetrafluoropropylidenimine, B.P. 57° C. (760 mm.).

*Analysis.*—Calcd. for $C_4H_2F_7N$: C, 24.38; H, 1.03; F, 67.49; N, 7.11; mol.wt., 197. Found: C, 24.14; H, 1.48; F, 66.99; H, 6.89; mol.wt., 197 (mass spec.).

The infrared spectrum showed bands at $3.06\mu$ (NH), $3.35\mu$ (saturated CH), $5.93\mu$ (C=N), and $8-9\mu$ (C–F). The nuclear magnetic resonance spectrum showed both syn and anti isomers to be present. The structure was also corroborated by the nuclear magnetic resonance spectrum.

By applying the above-described procedure to different starting materials, other polyfluorinated imines of this invention are obtained. Examples of such reaction products are those having the formulas:

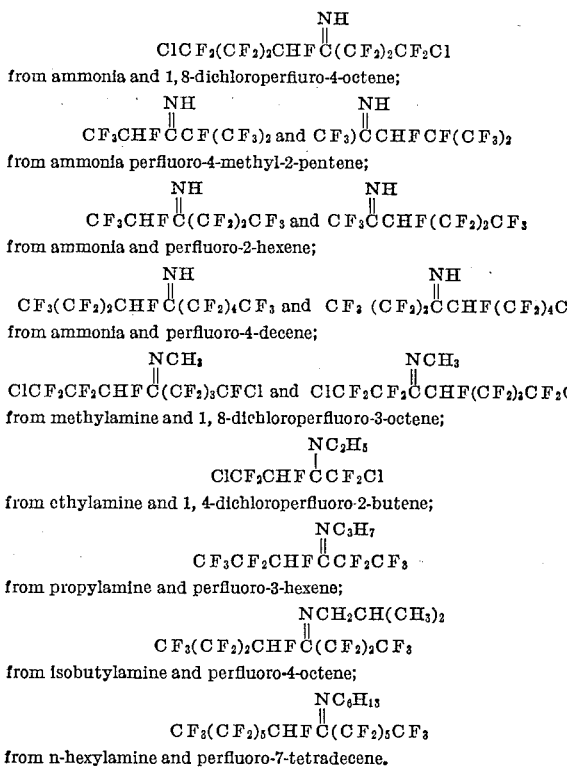

from n-hexylamine and perfluoro-7-tetradecene.

EXAMPLE 2

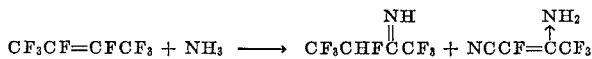

Using the same apparatus as in Example 1, a mixture of 100 g. (0.5 mole) of octafluoro-2-butene and 250 ml. of ether was cooled to between $-35$ and $-40°$ C. and ammonia (51 g., 3 moles, 62 ml. at $-80°$ C.) was distilled into the stirred solution over a 2.5-hour period. The mixture was then stirred for one additional hour at $-35°$ C., allowed to warm to room temperature overnight, and filtered. Distillation of the filtrate gave first 58.0 g. (59% yield) of 1-trifluoromethyl-2,3,3,3-tetrafluoropropylidenimine, B.P. 57° C. at atmospheric pressure, then 3.9 g. (5% yield) of 3-amino-2,4,4,4-tetrafluoro-2-butenenitrile, B.P. 54° C. at 5 mm. pressure. The latter product was shown to be a single compound by gas chromatography.

*Analysis.*—Calcd. for $C_4H_2F_4N_2$: C, 31.18; H, 1.31; F, 49.32; N, 18.19; mol.wt., 154. Found: C, 31.14; H, 1.50; F, 49.88; N, 18.18; mol.wt., 154 (mass spec.).

The infrared spectrum showed bands at 2.88, 3.00 and $3.11\mu$ ($NH_2$), $4.51\mu$ (conj. C≡N), $5.96\mu$ (C=C), $6.18\mu$ ($NH_2$), and $8-9\mu$ (C–F). The nuclear magnetic resonance spectrum also supported the assigned structure.

EXAMPLE 3

The reaction of Example 2 was repeated under different conditions to give the same products, but in different ratios.

A mixture of 100 g. (0.5 mole) of octafluoro-2-butene, 100 g. (6 moles) of ammonia and 100 ml. of ether was heated at 50° C. for 10 hours under autogenous pressure in an agitated 1-liter steel tube. The reaction mixture was filtered and the solids were rinsed with ether. Distillation of the combined filtrate and washings gave 48.2 g. (49% yield) of 1-trifluoromethyl-2,3,3,3-tetrafluoropropylidenimine, B.P. 55° C., and 21.3 g. (28% yield) of 3-amino-2,4,4,4-tetrafluoro-2-butenenitrile, B.P. 80–81° C. (20 mm.).

When the above-described procedure is applied to the reaction of ammonia with other 1-(trifluoromethyl)-perhalo-2-alkenes, other polyfluorinated imines and β-amino-α,β-unsaturated nitriles are obtained. Examples of such reaction products are those having the formulas:

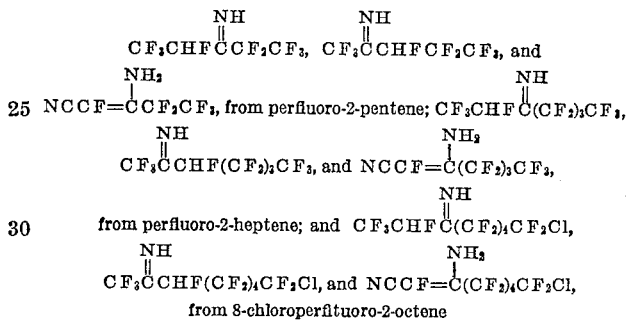

from 8-chloroperfluoro-2-octene

EXAMPLE 4

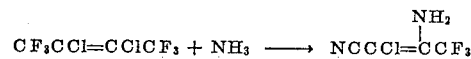

A mixture of 58 g. (0.25 mole) of 2,3-dichlorohexafluoro-2-butene, 26 g. (1.5 moles) of ammonia and 100 ml. of ether was heated at 50° C. for 10 hours in an agitated steel tube under autogenous pressure. The resulting mixture was filtered and the solids were rinsed with ether. Distillation of the combined filtrate and washings gave 25.8 g. (61% yield) of 3-amino-2-chloro-4,4,4-trifluoro-2-butenenitrile, B.P. 62° C. (0.5 mm.), $n_D^{25}$ 1.4688.

*Analysis.*—Calcd. for $C_4H_2ClF_3N_2$: C, 28.17; H, 1.18; Cl, 20.80; F, 33.43; N, 16.43. Found: C, 28.37; H, 1.22; Cl, 20.71; F, 33.21; N, 16.44.

The infrared spectrum showed bands at 2.88, 3.01, and $3.13\mu$ ($NH_2$), $4.52\mu$ (conj. C≡N), $6.06\mu$ (C=C) with a shoulder at $6.2\mu$ ($NH_2$), $8-9\mu$ (C–F), and $12.06\mu$ (C–Cl). The nuclear magnetic resonance spectrum confirmed the structure.

Application of the above-described procedure to other 1-(trifluoromethyl)perhalo-2-alkenes gives other polyfluorinated β-amino-α,β-unsaturated nitriles, examples of which are:

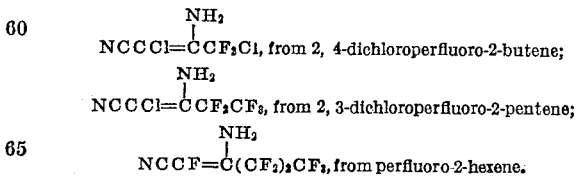

The fluorinated nitrogen compounds of this invention are useful as polymerization inhibitors, i.e., as stabilizers, for polymerizable ethylenic monomers. This utility is shown by the following tests of inhibition of the free radical-induced polymerization of a typical polymerizable monomer, methyl methacrylate.

Test solutions were prepared from 1 ml. of distilled, uninhibited methyl methacrylate (MMA) and 0.1 ml. of representative compounds of this invention, listed in the table below. To each of the resulting homogeneous solutions was added the same catalytic amount of the powerful free radical-producing polymerization initiator azobis(isobutyronitrile). As the control, the same amount of the same initiator was added to MMA (without any fluorinated nitrogen compound), and a blank of pure MMA, without initiator or stabilizer, was also tested. All test samples were heated in stoppered test tubes under an atmosphere of air on the steam bath for two hours. At the end of this time, the tubes were cooled and 0.6-ml. portions of the samples were withdrawn into a 1.0-ml. pipette. The time required for 0.2 ml. of the liquid to drain out of the pipette was taken as a measure of relative viscosity and hence of the amount of polymerization. The results are shown in the table below.

| Sample Composition | Time to Drain 0.2 ml. |
|---|---|
| Blank (pure MMA) | 12 secs. |
| Control (MMA plus initiator) | 3 mins. 55 secs. |
| MMA plus initiator plus $CF_3CHF\overset{NH}{\overset{\|}{C}}CF_3$ | 2 secs. |
| MMA plus initiator plus $NCCF=\overset{NH_2}{\overset{\|}{C}}CF_3$ | 2 mins. 20 secs. |
| MMA plus initiator plus $NCCCl=\overset{NH_2}{\overset{\|}{C}}CF_3$ | 7 secs. |

These results shown that the compounds of this invention are effective free radical inhibitors and thus are able to serve as polymerization stabilizers for polymerizable monomers.

The foregoing detailed description has been given for clarity of understanding only and no unnecessary limitations are to be understood therefrom. The invention is not limited to the exact details shown and described for obvious modifications will be apparent to those skilled in the art.

The embodiments of the invention in which an exclusive property or privilege is claimed are defined as follows:

1. A compound of the class consisting of

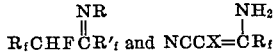

in which R is hydrogen or lower alkyl, each of $R_f$ and $R'_f$ is lower perfluoroalkyl or lower ω-chloroperfluoroalkyl, and X is fluorine or chlorine.

2. 1 - trifluoromethyl - 2,3,3,3 - tetrafluoropropylidenimine, the compound of the first formula of claim 1 wherein $R_f$ and $R'_f$ are $CF_3$ and R is hydrogen.

3. 3-amino-2,4,4,4-tetrafluoro-2-butenenitrile, the compound of the second formula of claim 1 wherein X is F and $R_f$ is $CF_3$.

4. 3 - amino-2-chloro-4,4,4-trifluoro-2-butenenitrile, the compound of the second formula of claim 1 wherein X is Cl and $R_f$ is $CF_3$.

5. Process for preparing compounds of claim 1 which comprises reacting an ammonia-type compound of the formula $RNH_2$, where R is hydrogen or lower alkyl, with an internally unsaturated perhalopolyfluoroalkene of the formula

where X, $R_f$ and $R'_f$ are as defined in claim 1, at a temperature of from −50 to +150° C., the mole ratio of the ammonia-type reactant to the perhaloalkene being at least 2:1.

6. Process for preparing the β-fluoroalkylidenimines of the first formula of claim 1 which comprises reacting at −50 to +150° C. a compound of the formula $RNH_2$ where R is hydrogen or lower alkyl with a compound of the formula $R_f-CF=CF-R'_f$ where each of $R_f$ and $R'_f$ is a lower perfluoroalkyl or ω-chloroperfluoroalkyl, the mole ratio of $RNH_2$ to $R_fCF=CFR'_f$ being at least 2:1.

7. Process of claim 6 wherein $R_f$ and $R'_f$ are different, followed by separating the resulting mixture of isomers into its components.

8. Process for preparing the β-amino-α,β-unsaturated perhalonitriles of the second formula of claim 1 which comprises reacting in the range of −50 to +150° C. ammonia with a 1-(trifluoromethyl)perhalo-2-alkene of the formula $CF_3CX=CXR_f$ where X is F or Cl and $R_f$ is a lower perfluoroalkyl or ω-chloroperfluoroalkyl.

References Cited

UNITED STATES PATENTS

| 3,121,108 | 2/1964 | Josey et al. | 260—465.5 XR |
| 3,226,439 | 12/1965 | Middleton | 260—566 |
| 3,326,976 | 6/1967 | Middleton | 260—566 |
| 3,342,864 | 9/1967 | Middleton | 260—593 XR |

JOSEPH P. BRUST, Primary Examiner

U.S. Cl. X.R.

23—88; 252—401; 260—566, 583

PO-1050
(5/69)

UNITED STATES PATENT OFFICE
CERTIFICATE OF CORRECTION

Patent No. 3,475,481          Dated November 12, 1969

Inventor(s) Carl G. Krespan

It is certified that error appears in the above-identified patent and that said Letters Patent are hereby corrected as shown below:

Column 6, line 14, the formula should read:

$$R_f - CX = CX - R'_f$$

SIGNED AND
SEALED
FEB 17 1970

(SEAL)
Attest:

Edward M. Fletcher, Jr.
Attesting Officer

WILLIAM E. SCHUYLER, JR.
Commissioner of Patents